(12) United States Patent
Ferguson et al.

(10) Patent No.: US 9,185,046 B2
(45) Date of Patent: *Nov. 10, 2015

(54) PACKET SPRAYING FOR LOAD BALANCING ACROSS MULTIPLE PACKET PROCESSORS

(71) Applicant: Juniper Networks, Inc., Sunnyvale, CA (US)

(72) Inventors: Dennis C. Ferguson, Palo Alto, CA (US); Chi-Chung Chen, Cupertino, CA (US); Thomas M. Skibo, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/857,537

(22) Filed: Apr. 5, 2013

(65) Prior Publication Data

US 2013/0223224 A1    Aug. 29, 2013

Related U.S. Application Data

(63) Continuation of application No. 12/840,406, filed on Jul. 21, 2010, now Pat. No. 8,416,686, which is a continuation of application No. 12/108,713, filed on Apr. 24, 2008, now Pat. No. 7,782,782, which is a continuation of application No. 10/120,610, filed on Apr. 12, 2002, now Pat. No. 7,382,782.

(51) Int. Cl.
| | | |
|---|---|---|
| *G01R 31/08* | (2006.01) | |
| *H04L 12/873* | (2013.01) | |
| *H04L 12/773* | (2013.01) | |
| *H04L 12/801* | (2013.01) | |
| *H04L 12/803* | (2013.01) | |

(52) U.S. Cl.
CPC .............. *H04L 47/522* (2013.01); *H04L 45/60* (2013.01); *H04L 47/10* (2013.01); *H04L 47/125* (2013.01)

(58) Field of Classification Search
CPC ....... H04L 45/60; H04L 47/10; H04L 47/125; H04L 47/522
See application file for complete search history.

(56) References Cited

U.S. PATENT DOCUMENTS

| | | | |
|---|---|---|---|
| 6,092,115 A | 7/2000 | Choudhury et al. | |
| 6,128,642 A | 10/2000 | Doraswamy et al. | |
| 6,321,320 B1* | 11/2001 | Fleischman et al. | 711/217 |
| 6,553,033 B1 | 4/2003 | Wallmeier | |
| 6,675,220 B1* | 1/2004 | Bergamasco et al. | 709/232 |
| 6,850,490 B1* | 2/2005 | Woo et al. | 370/230 |
| 6,886,164 B2 | 4/2005 | Meiri | |
| 7,016,367 B1 | 3/2006 | Dyckerhoff et al. | |
| 7,069,356 B2 | 6/2006 | Meyer et al. | |
| 7,382,782 B1* | 6/2008 | Ferguson et al. | 370/395.41 |

(Continued)

*Primary Examiner* — David Oveissi
(74) *Attorney, Agent, or Firm* — Harrity & Harrity, LLP (57) ABSTRACT

A network device includes multiple packet processing engines implemented in parallel with one another. A spraying component distributes incoming packets to the packet processing engines using a spraying technique that load balances the packet processing engines. In particular, the spraying component distributes the incoming packets based on queue lengths associated with the packet processing engines and based on a random component. In one implementation, the random component is a random selection from all the candidate processing engines. In another implementation, the random component is a weighted random selection in which the weights are inversely proportional to the queue lengths.

19 Claims, 9 Drawing Sheets

(Q1 Selected)

(56) References Cited

U.S. PATENT DOCUMENTS 7,782,782 B1    8/2010  Ferguson et al.
8,416,686 B2 *  4/2013  Ferguson et al. ............ 370/230
2002/0093356 A1    7/2002  Williams et al.
2003/0156535 A1    8/2003  Lebizay et al.
2006/0146875 A1    7/2006  Yang
2010/0284271 A1   11/2010  Ferguson et al.

* cited by examiner

Fig. 6B
(Q1 Selected)

Fig. 7A

Fig. 7B
(Q0 Selected)

PACKET SPRAYING FOR LOAD BALANCING ACROSS MULTIPLE PACKET PROCESSORS

RELATED APPLICATIONS

This application is a continuation of U.S. patent application Ser. No. 12/840,406, filed Jul. 21, 2010, which is a continuation of U.S. patent application Ser. No. 12/108,713, filed Apr. 24, 2008 (now U.S. Pat. No. 7,782,782), which is a continuation of U.S. patent application Ser. No. 10/120,610, filed Apr. 12, 2002 (now U.S. Pat. No. 7,382,782). The disclosures of these applications are incorporated herein by reference.

BACKGROUND OF THE INVENTION

A. Field of the Invention

The present invention relates generally to data transfer and, more particularly, to systems and methods for allocating bandwidth for the processing of packets within a network device, such as a router.

B. Description of Related Art

Conventional networks typically include routers that route packets from one or more sources to one or more destinations. A packet carries data or control information and can be transmitted through a network. A router is a switching device that receives packets at input ports and, based on destination or other information included in the packets, routes the packets through output ports to final or intermediary destinations. Conventional routers determine the proper output port for a particular packet by evaluating header information included in the packet.

Conventional routers include buffers to support a particular bandwidth. If the input network traffic exceeds the bandwidth of the router, the router may drop packets. Expanding the bandwidth depends on a number factors, including the input line rate, the speed of the output determination process, and the blocking characteristics of the switching mechanisms of the router. Router bandwidth also relates to the processing power of the router. The processing power typically depends on the size of the memory (i.e., bigger and faster systems require larger memory capacities) and the ability of the router to determine where to route packets.

A key problem in designing routers is making them scale to higher aggregate bandwidths. To process higher bandwidths in a single conventional router, the size and configuration of the router typically has to be modified or redesigned. The process of modifying a router to increase bandwidth usually entails tedious design processes with the risk that the new design will not perform as intended or integrate well with other routers in the network, the outlay of resources (both monetary and human), as well as potential time delays.

One technique for increasing router bandwidth is to build a router with multiple packet processing components that operate in parallel. Incoming packet streams are divided among the packet processing components, processed, and then reassembled into the packet stream.

When dividing the packet stream among the number of packet processing components, one issue that arises is how to divide the packet stream so that the work load is evenly distributed among the packet processing components. One conventional solution to this problem is to use a packet sprayer to equitably distribute the packets to the processing components.

The sprayer maintains a counter for each packet processing component. The counters keep track of the packet stream being forwarded to each packet processing component by counting the number of bytes in the stream. An incoming packet is sprayed to the packet processing component corresponding to the counter with the lowest stream count value. In this manner, the sprayer balances the number of bytes transmitted to the packet processing components.

One problem with such a conventional sprayer is that, although it balances byte count very well, it does not necessarily do a good job of balancing packet count. For example, if there are four packet processing components, and the incoming traffic pattern includes three 4500-byte packets followed by 100 45-byte packets, the above-described sprayer may spray one of the 4500-byte packets to each of the first three packet processing components and the 100 45-byte packets to the last packet processing component. Because each individual packet requires a certain amount of processing regardless of its size, the packet processing component that receives the 100 smaller packets will have significantly degraded performance relative to the other three packet processing components. Thus, in this situation, the sprayer will not effectively load balance the packet processing components.

Therefore, there exists a need for systems and methods that increase the bandwidth for processing of packets in a router by more effectively load balancing across multiple parallel packet processing components.

SUMMARY OF THE INVENTION

Systems and methods consistent with the principles of the invention, among other things, provide for improved load balancing across packet processing components.

One aspect of the invention is directed to a load balancing device. The load balancing device includes multiple queues designated to process packets from a stream of packets received by the load balancing device. Further, the device includes spray logic configured to select one of the queues to receive each of the received packets based at least partially on a random selection function.

Another aspect of the invention is a network device that includes packet processors, a sprayer, and a desprayer. The packet processors process received packets by determining destination information for the received packets. The sprayer receives at least one packet stream and distributes the packets of the packet stream to selected ones of the packet processors. The sprayer selects the packet processor to receive a particular one of the packets based on a selection function. A desprayer receives the packets processed by the packet processors and assembles the packets into at least one outgoing packet stream.

Yet another aspect of the invention is a method of distributing incoming data items to one of a number of queues. The method includes determining whether a queue is a candidate to receive a data item based on a comparison of a predetermined threshold value to a sum of a length of the data item to a length of the queue. The method includes selecting, when at least one queue is determined to be a candidate queue, one of the candidate queues based on a random selection process. Further, the method includes selecting, when none of the queues are determined to be a candidate queue, one of the queues based on the length of the queues.

Still another aspect of the invention is a circuit for selecting from among a number of queues. The circuit comprises a series of weight compute components configured to calculate a probability value associated with each of the queues and a series of summers configured to receive the probability values and generate a series of cumulative probability values. Further, a random generator generates a random number and a multiplication component multiplies the random number by a final value in the series of cumulative probability values to obtain a multiplied value. A series of comparators determine whether the multiplied value is less than the values of the series of cumulative probability values.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a sprayer distributes packets to multiple parallel packet processors. The sprayer distributes packets using a spraying method based on, for example, byte count. Additionally, a random component is introduced into the spraying algorithm. The random component may be a straightforward random selection or other type of random selection, such as a weighted random selection.

Exemplary Router Configuration

Figure 1:
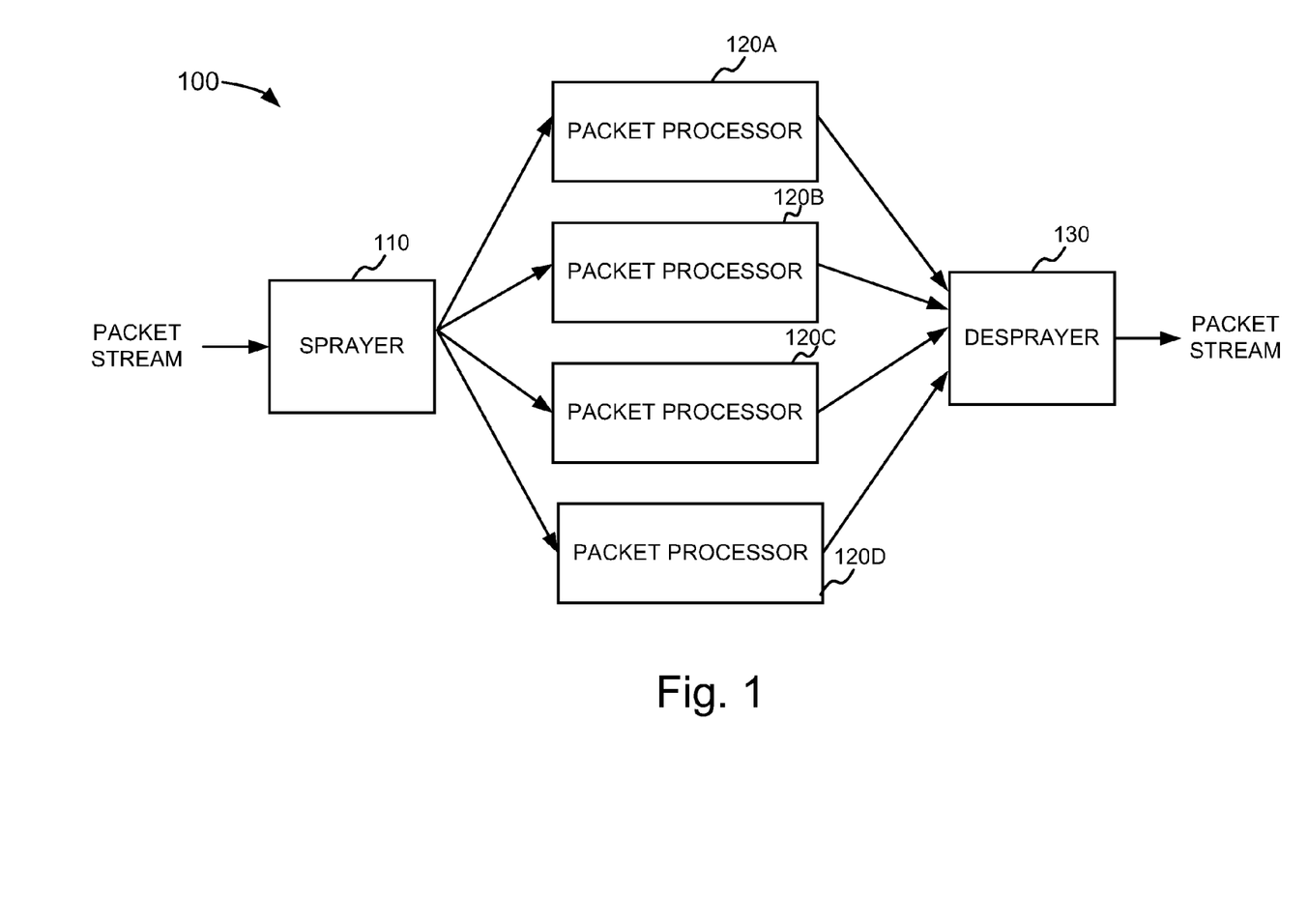
FIG. 1 is a diagram of an exemplary router configuration consistent with the principles of the invention.

FIG. 1 is a diagram of an exemplary router 100 consistent with aspects of the invention. Router 100 may include a sprayer 110, multiple packet processors 120 (120A, 120B, 120C, and 120D), and a desprayer 130. Sprayer 110 may include a bandwidth divider that receives an incoming packet stream containing one or more packets and distributes the packets to packet processors 120A-120D.

Packet processors 120 may include packet forwarding engines that process the packets to forward the packets through router 100. For example, packet processors 120 may analyze the contents of a packet and, using routing and/or forwarding tables, identify the output port through which to transmit the packet. Packet processors 120 may attach an identifier to the packets to identify the output port. Desprayer 130 may include a bandwidth combiner that receives the processed packets from packet processors 120A-120D and transmits the packets on an outgoing packet stream.

Figure 2:
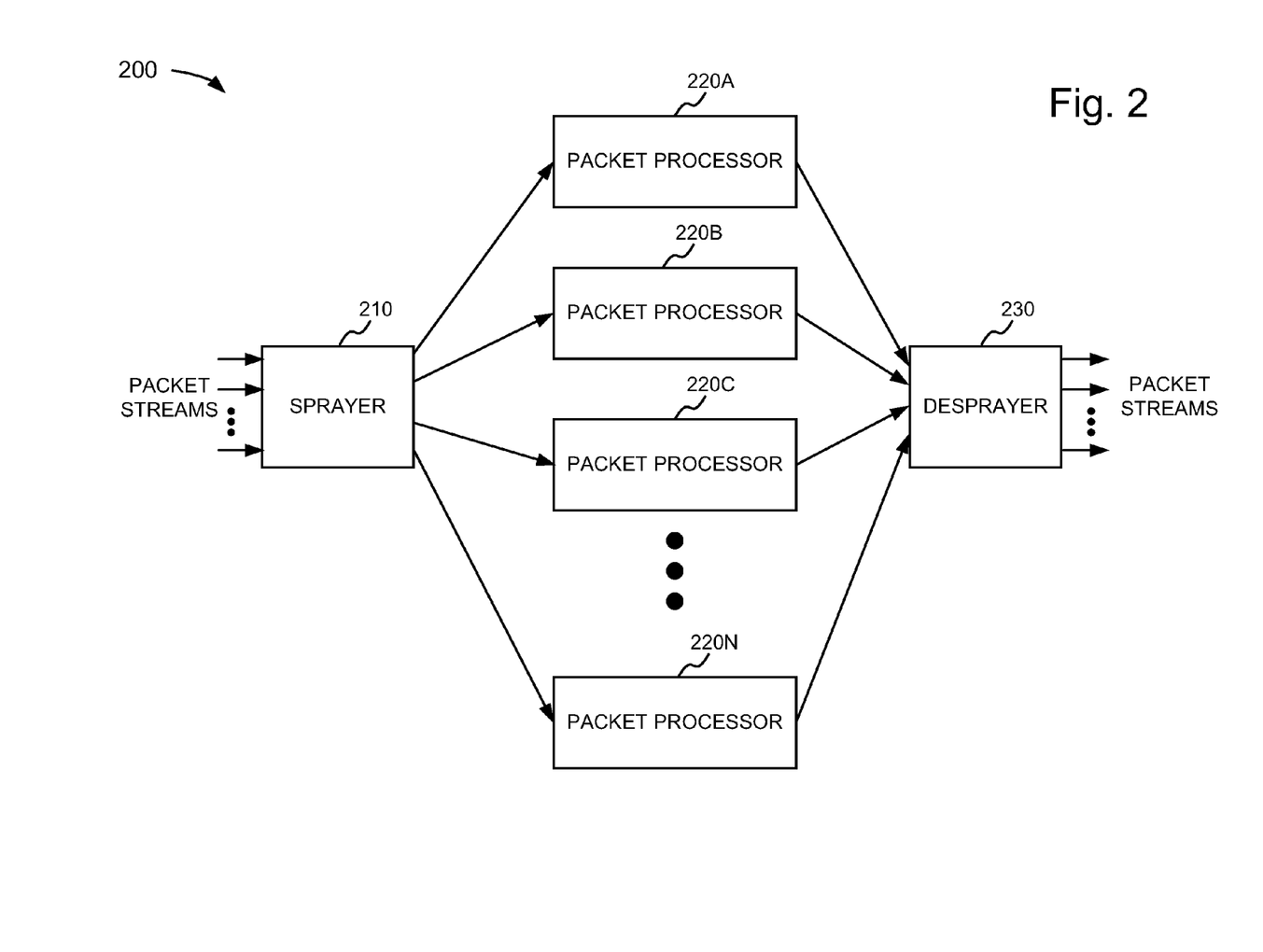
FIGS. 2 and 3 are exemplary diagrams of alternate router configurations consistent with the principles of the invention.

FIG. 1 illustrates a very simple router configuration. In practice, the router may have more of these components and/or other components. For example, FIG. 2 is an exemplary diagram of an alternate router 200 consistent with the principles of the invention. Router 200 may include a sprayer 210, packet processors 220 (220A, 220B, 220C, ..., 220N), and a desprayer 230. In this case, sprayer 210 may receive multiple incoming packet streams, each containing one or more packets and distribute the packets to packet processors 220A-220N.

Packet processors 220 may process the packets to forward the packets through router 200. For example, packet processors 220 may analyze the contents of a packet to identify the output port through which to transmit the packet. Desprayer 230 may receive the processed packets from packet processors 220A-220N and transmit the packets on outgoing packet streams, as instructed by packet processors 220.

Figure 3:
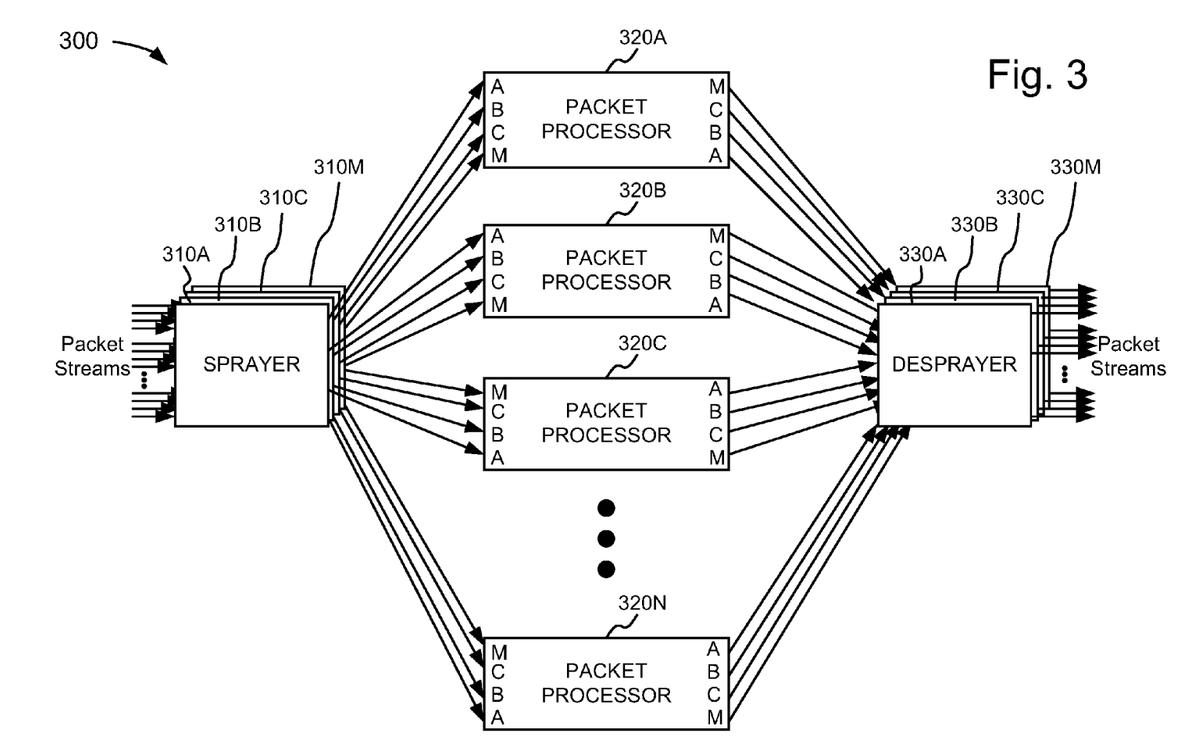

FIG. 3 is another exemplary diagram of an alternate router 300 consistent with the principles of the invention. Router 300 may include multiple sprayers 310 (310A, 310B, 310C, ..., 310M), packet processors 320 (320A, 320B, 320C, ..., 320N), and desprayers 330 (330A, 330B, 330C, ..., 330M). In this implementation, each of sprayers 310 may receive multiple incoming packet streams, each containing one or more packets and distribute the packets to the packet processors 320A-320N. Each of sprayers 310A-310M may, for example, connect to the same port of each of the packet processors 320. In other words, sprayer 310A may connect to port A of packet processor 320A, 320B, 320C, ..., 320N; sprayer 310B may connect to port B of packet processor 320A, 320B, 320C, ..., 320N; etc.

Packet processors 320 may process the packets to forward the packets through router 300. For example, packet processors 320 may analyze the contents of a packet to identify the output port through which to transmit the packet. Each of desprayers 330 may receive the processed packets from the packet processors 320A-320N and transmit the packets on outgoing packet streams, as instructed by packet processors 320. Each of desprayers 330A-330M may connect to the same port of each of packet processors 320. In other words, desprayer 330A may connect to port A of packet processor 320A, 320B, 320C, ..., 320N; desprayer 330B may connect to port B of packet processor 320A, 320B, 320C, ..., 320N; etc.

Sprayer

Figure 4:
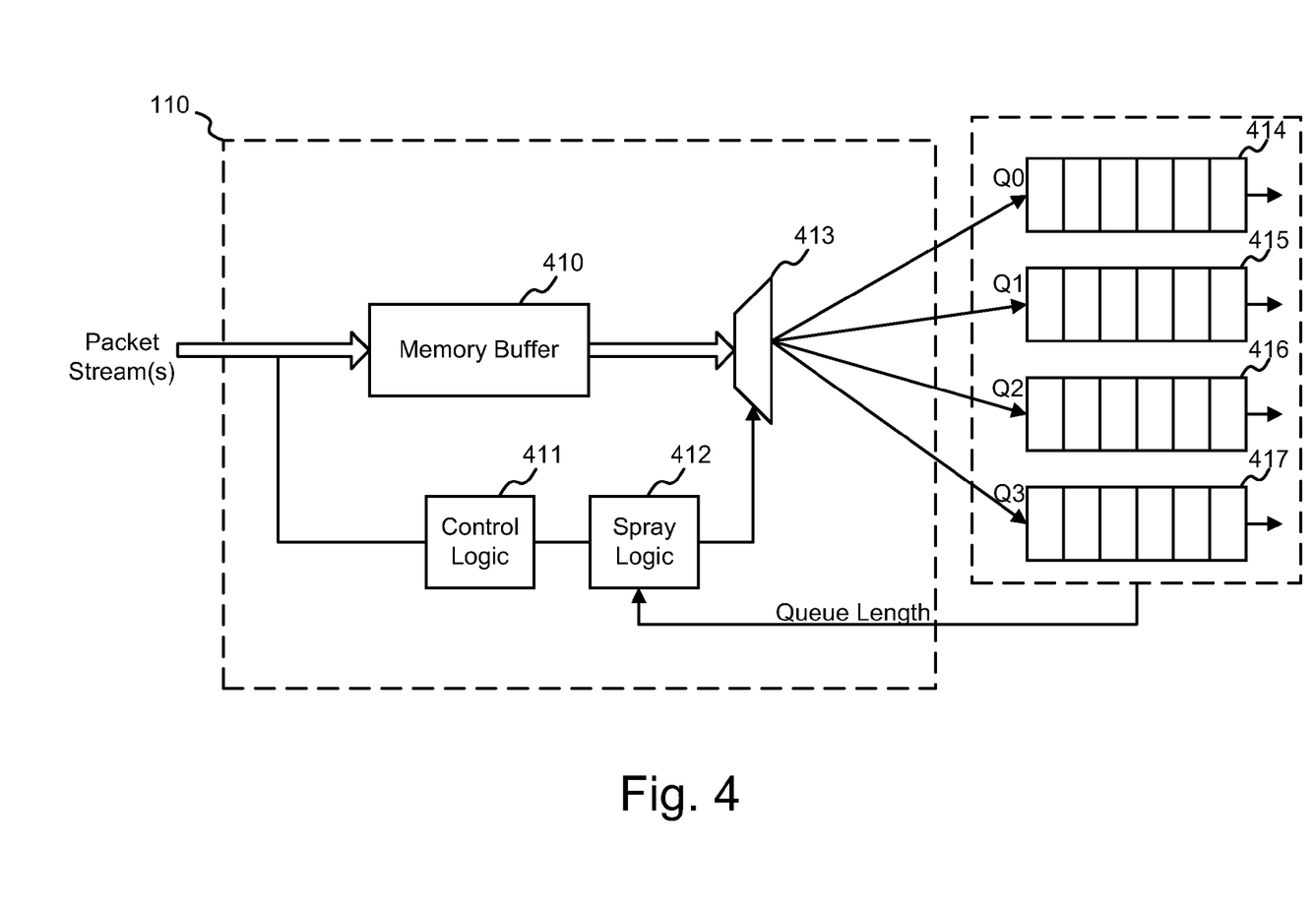
FIG. 4 is a diagram illustrating portions of the exemplary routers in additional detail.

FIG. 4 is a diagram illustrating portions of sprayer 110 of FIG. 1 in additional detail. One of ordinary skill in the art will recognize that sprayers 210 and 310 may be implemented similarly to sprayer 110. Accordingly, further details relating to the construction of these sprayers will not be described herein.

As shown, sprayer 110 includes a memory buffer 410, control logic 411, spray logic 412, and a multiplexing component 413. Buffers 414-417 represent input queues (Q0-Q3) of packet processors 120A-120D, respectively.

Packets input to sprayer 110 are initially stored in memory buffer 410. Control logic 411 receives information relating to each input packet. For example, control logic 411 may receive information identifying each arriving packet in memory 410 and an indication of the packet's length. Control logic 411 forwards this information to spray logic 412, which is connected to multiplexing component 413. Spray logic 412 controls multiplexing component 413 to output the packets stored in memory buffer 410 to a selected one of buffers 414-417.

Exemplary Processing

Consistent with an aspect of the invention, sprayer 110 sprays its input packets using a spraying method based on, for example, byte count. Additionally, a random component may be introduced into the spraying method. The spraying method tends to avoid the uneven load balancing situations that may occur with conventional spraying algorithms that are based on stream flow.

Figure 5:
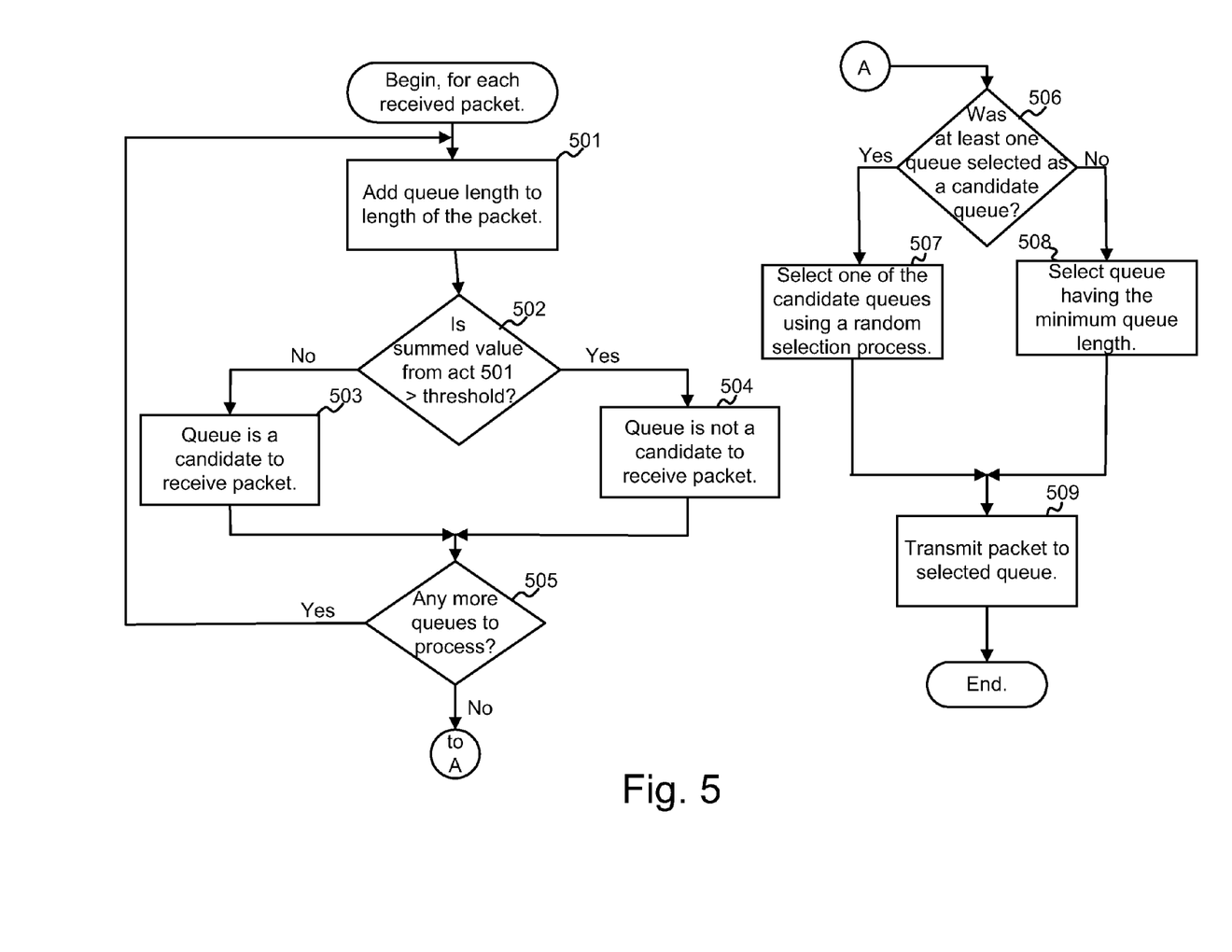
FIG. 5 is a flow chart illustrating one embodiment, consistent with the principles of the invention, of the sprayer shown in FIG. 4.

FIG. 5 is a flow chart illustrating one embodiment consistent with the principles of the invention through which sprayer 110 sprays its input packets to packet processors 120A-120D.

To begin, for each input packet, spray logic 412 compares an expected actual queue length of buffers 414-417 to a threshold value (acts 501 and 502). More specifically, spray logic 412 adds the actual queue length of each of buffers 414-417 (i.e., the amount of space used in buffers 414-417) to the length of the packet under consideration (act 501). This summed value is then compared to a threshold value (act 502). The threshold value is a predetermined value, which may, for example, be selected by an operator. Queues with summed values that are less than the threshold value are candidates for the packet that is to be sprayed (act 503). Otherwise, queues with summed values that are greater than the threshold value are removed as candidates for the packet that is to be sprayed (act 504). Acts 501-504 are repeated for each queue (act 505).

When the queues have been initially processed to create a set of candidate queues, spray logic 412 determines if at least one queue was determined to be a candidate queue (act 506). If so, spray logic 412 selects one of the candidate queues using a random selection process (act 507). If not, spray logic 412 selects the queue having the minimum queue length (act 508). Spray logic 412 controls multiplexing component 413 to transmit the packet to the selected queue (act 509).

In one embodiment consistent with aspects of the invention, the random selection process in act 507 is a simple random selection among the candidate queues in which each candidate queue has an equal probability of being selected. In a second embodiment, the random selection may be based on another criteria, such as a weighted probability.

Figure 6A:
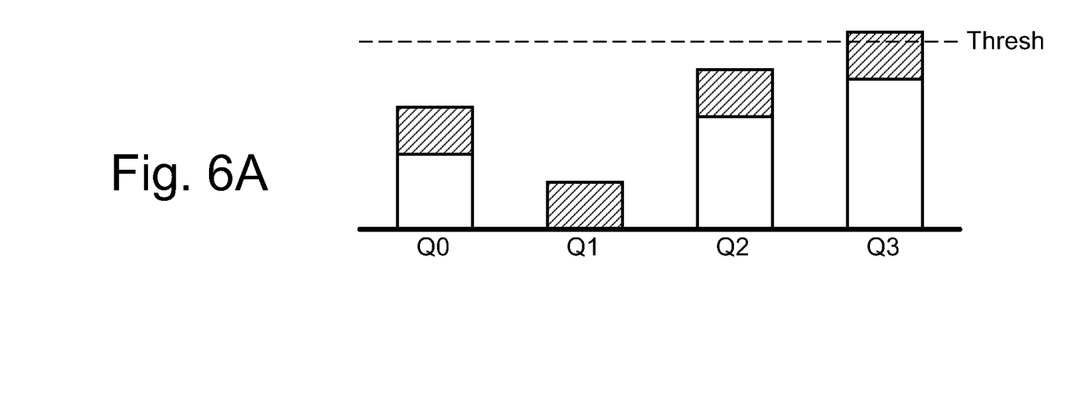
FIGS. 6A-6B and 7A-7B are diagrams that conceptually illustrate the selection process shown in FIG. 5.
Figure 6B:
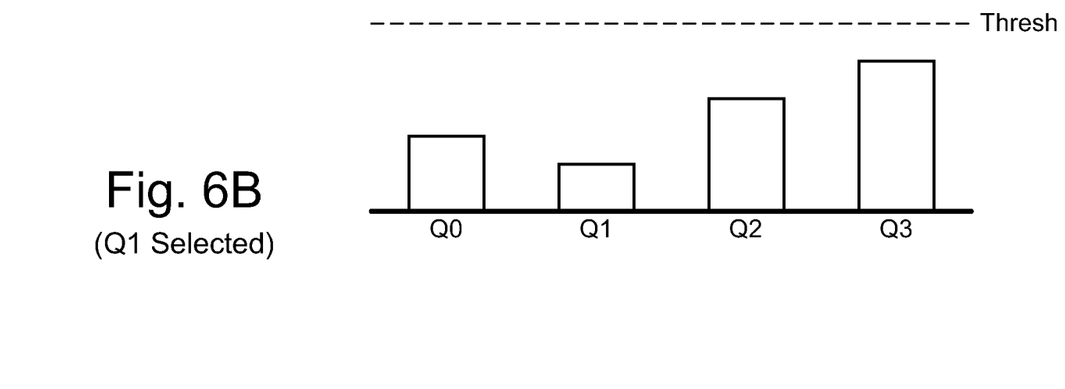

FIGS. 6A-6B are diagrams that conceptually illustrate the process described with regard to FIG. 5. Four queues, labeled as Q0, Q1, Q2, and Q3, are illustrated. In this example, each queue begins below the threshold level (Thresh). The length of the arriving packet is illustrated as the shaded portion corresponding to each queue in FIG. 6A. As can be seen, if the packet were added to each queue, Q3 would be above the threshold. Accordingly, only queues Q0, Q1, and Q2 are taken into consideration as a possible selection candidate. Assume that the random selection process chooses queue Q1 as the queue to which the packet is to be sprayed. The random selection process may be implemented as a straight random selection in which each of queues Q0, Q1, and Q2 have a one-third chance of being selected or as a weighted random selection based on the queue length (described in more detail below).

Figure 7A:
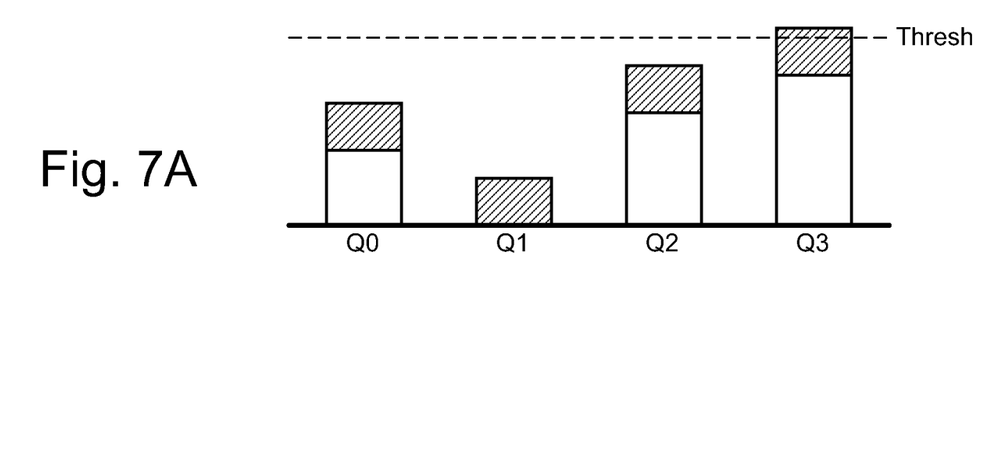
Figure 7B:
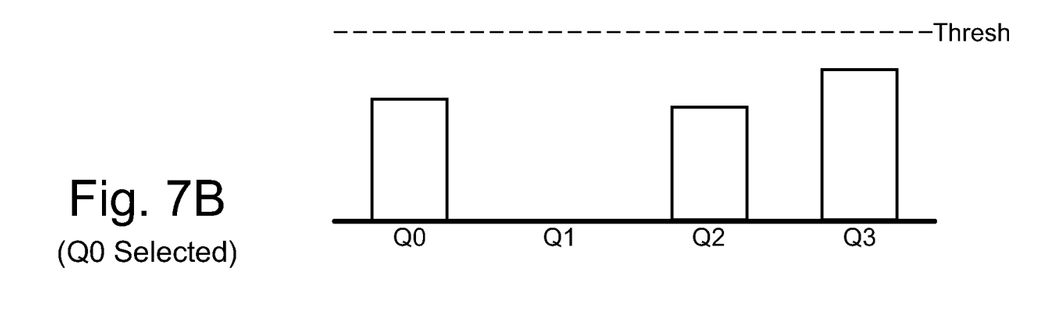

As shown in FIG. 6B, when queue Q1 is selected to receive the packet, the length of Q1 will increase by the length of the packet. Queues Q0, Q2, and Q3, which did not receive the packet, remain at their prior levels FIGS. 7A-7B are diagrams, similar to FIGS. 6A-6B, that conceptually illustrate the selection process shown in FIG. 5. In this example, however, Q0 is chosen as the randomly selected queue.

Weighted Random Selection

As previously mentioned, in one embodiment, the random selection of candidate queues may be performed based on a weighted random selection process. The weighting for each candidate queue may be inversely proportional to the length of the queue. One way to achieve this type of weighting is to subtract the queue length from the threshold value.

For example, if there are three candidate queues, after eliminating queues that would go over the threshold with the arriving packet, and the candidate queues have expected queue byte counts of x, y, and z, and three corresponding weights, called $w_1$, $w_2$, and $w_3$, respectively, the weights may be calculated as follows:

$w_1$=Threshold−$x$, $w_2$=Threshold−$y$, and $w_3$=Threshold−$z$.

The first queue has the probability $w_1/(w_1+w_2+w_3)$ of being selected. Similarly, the second queue has the probability $w_2/(w_1+w_2+w_3)$ of being selected and the third queue has the probability $w_3/(w_1+w_2+w_3)$ of being selected.

By weighting the selection probabilities inversely proportional to the lengths of the queues, higher selection priority is given to shorter queues (i.e., less filled queues). This minimizes the chance of spraying into queues that are almost full, yet still balances packet distribution.

Figure 8:
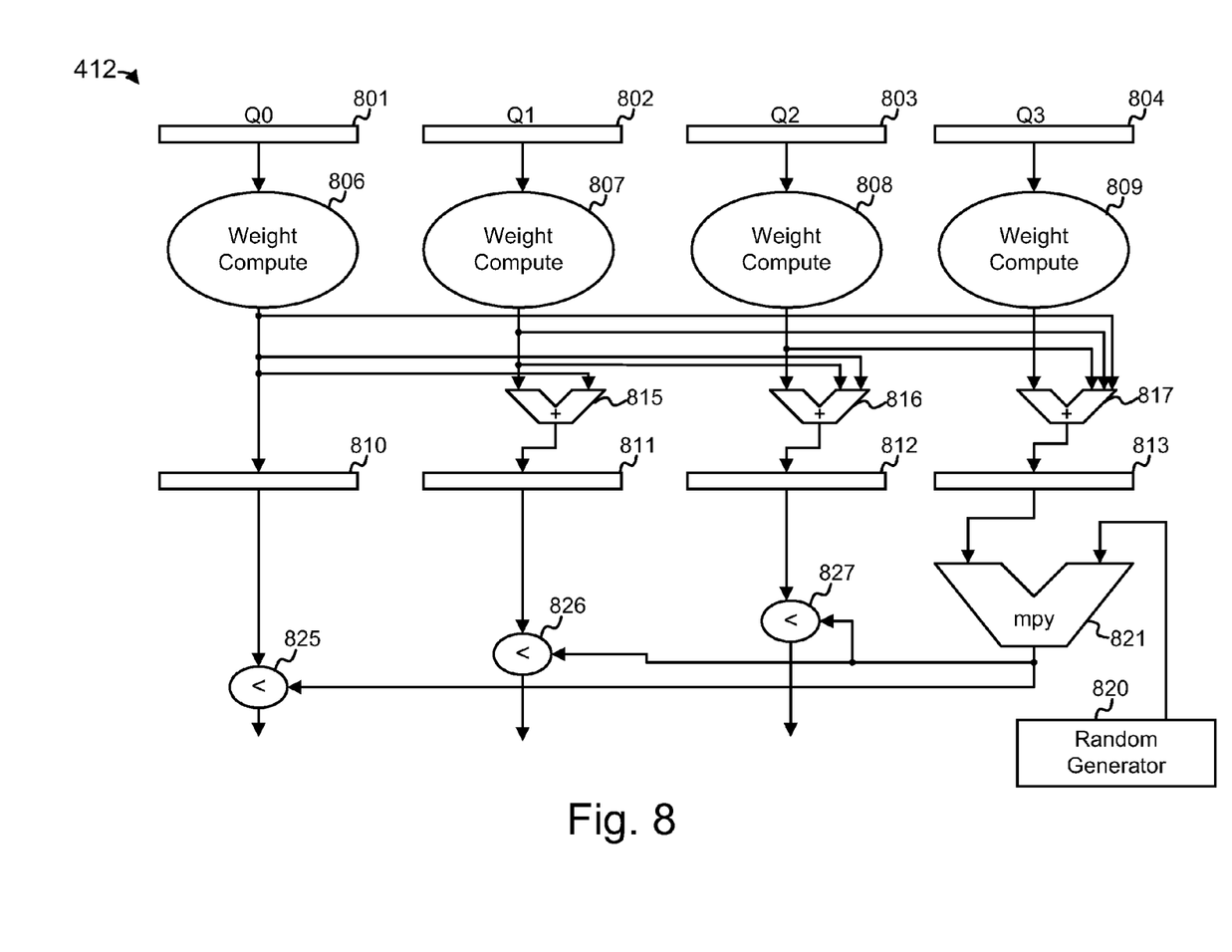
FIG. 8 is a diagram illustrating a hardware implementation of portions of the spray logic shown in FIG. 4.

FIG. 8 is a diagram illustrating an implementation of the portions of spray logic 412 for performing the weighted random selection.

Spray logic 412 includes registers 801-804 and weight compute components 806-809. These elements compute the individual probability weights (e.g., $w_1$, $w_2$, and $w_3$) for each queue. More particularly, registers 801-804 store the queue length of queues Q0-Q3. Weight compute components 806-809 receive the queue lengths from registers 801-804. Based on the queue lengths and the threshold value, each weight compute component 806-809 calculates the weight corresponding to the queue by subtracting the queue length (plus the arriving packet length) from the predetermined threshold value. For queues with lengths greater than the threshold, weight compute components 806-809 may output a value of zero, indicating a zero probability of that queue being selected.

The weight output from weight compute component 806 is buffered in register 810. The weight output from weight compute component 807 is summed with the weight from weight compute component 806 by summer 815 and then buffered in register 811. Similarly, register 812 buffers the sum of the output of weight compute components 806-808, as summed by summer 816. Register 813 buffers the sum of all of the weight compute components 806-809, as summed by summer 817. The value stored in register 813 corresponds to the denominator in the probability calculation for the queues (e.g., $w_1+w_2+w_3$ in the previous example).

Multiplication component 821 multiplies the output of register 813 by a random number generated by pseudo-random number generator 820. Pseudo-random number generator 820 may be, for example, a 31-bit LFSR (linear feedback shift register) in which the upper 16 output bits are used as the random number. The polynomial used for the LSFR may, for example, be as follows: $x^{31}+x^{27}+x^{23}+x^{19}+x^{15}+x^{11}+x^{10}+x^9+x^7+x^6+x^5+x^3+x^2+x^1+1$. In one embodiment, the output of multiplication component 821 may be scaled. For example, the output may be right shifted 32 bits.

Comparator 825 compares the output of register 810 (i.e., $w_1$) to the output of multiplication component 821. If the value from multiplication component 821 is less than $w_1$, the comparison result is positive. Similarly, comparator 826 compares the output of register 811 to the output of multiplication component 821 and comparator 827 compares the output of register 812 to the output of multiplication component 821. Spray logic 412 selects the queue corresponding to the first positive comparison by comparators 825, 826, and 827. Thus, if comparator 825 outputs a logic one (positive comparison), queue Q0 is selected. If, however, only comparators 826 and 827 output a logic one, queue Q1 is selected. If none of comparators 825-827 output a logic one, queue Q3 is selected.

Figure 9:
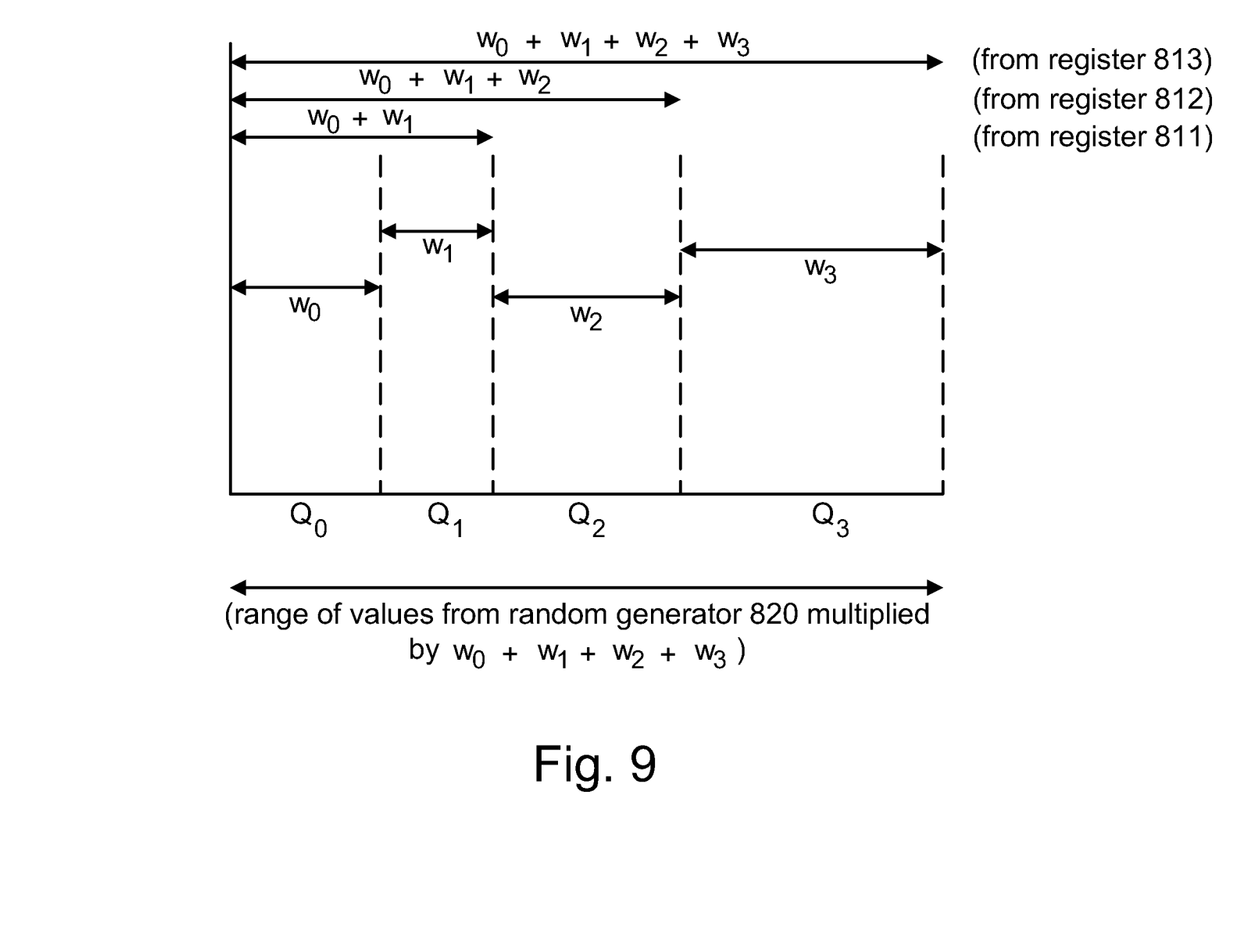
FIG. 9 is a diagram conceptually illustrating the relationship of various values calculated by the spray logic shown in FIGS. 4 and 8.

FIG. 9 is a diagram conceptually illustrating the relationship of the values calculated by spray logic 412. As can be seen, the values from registers 810-813 form a cumulative probability distribution against which the value from multiplication component 821 is compared.

CONCLUSION

As described above, a sprayer equitably distributes packets to a number of packet processing components such that packet load at the packet processing components is balanced.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts has been presented with respect to FIG. 5, the order of the acts may be different in other implementations consistent with principles of the invention.

Certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A method comprising:
   determining, by a device, a first amount of space being used in a first buffer of a plurality of buffers;
   determining, by the device, a first weight, for the first buffer, based on a difference between a threshold and the first amount of space being used in the first buffer;
   determining, by the device, a second amount of space being used in a second buffer of the plurality of buffers;
   determining, by the device, a second weight, for the second buffer, base on a difference between the threshold and the second amount of space being used in the second buffer;
   selecting, by the device, the first buffer based on the first weight;
   selecting, by the device, the second buffer based on the first weight and the second weight; and
   transmitting, by the device, a particular packet to the second buffer after selecting the second buffer.

2. The method of claim 1, further comprising:
   determining a third amount of space being used in a third buffer of the plurality of buffers,
   determining a length of the particular packet,
   determining a value based on the third amount of space being used in the third buffer and the length of the particular packet, and
   determining that the value exceeds the threshold before selecting the second buffer.

3. The method of claim 2, where the value is a sum of the third amount of space and the length of the particular packet.

4. The method of claim 2, where selecting the second buffer includes:
   removing, based on the value exceeding the threshold, the third buffer from being one of a plurality of candidate buffers of the plurality of buffers, and
   selecting, by using a random selection process and based on the first weight and the second weight, the second buffer from the plurality of candidate buffers.

5. The method of claim 1, where the threshold is selected by an operator associated with the device.

6. The method of claim 1, further comprising:
   determining that a value, associated with the second buffer, does not exceed the threshold before selecting the second buffer.

7. The method of claim 6, further comprising:
   determining the value, associated with the second buffer, based on the second amount of space being used in the second buffer.

8. The method of claim 6, further comprising:
   determining a length of the particular packet, and
   determining the value based on the length of the particular packet.

9. A non-transitory computer-readable medium storing instructions, the instructions comprising:
   one or more instructions that, when executed by a device, cause the device to:
      determine a first weight, for a first buffer of a plurality of buffers, based on a difference between a threshold and information associated with the first buffer;
      determine information associated with a second buffer of the plurality of buffers;
      determine a second weight, for the second buffer, based on a difference between the threshold and the information associated with the second buffer;
      select the first buffer based on the first weight;
      select the second buffer based on the first weight and the second weight; and
      transmit a particular packet to the second buffer after selecting the second buffer.

10. The non-transitory computer-readable medium of claim 9, where the information associated with the first buffer is an amount of space being used in the first buffer.

11. The non-transitory computer-readable medium of claim 9, where the one or more instructions to select the second buffer include:
   one or more instructions that, when executed by the device, cause the device to:
      determine a value for a third buffer of the plurality of buffers,
      determine that the value exceeds the threshold,
      remove, based on the value exceeding the threshold, the third buffer from being one of a plurality of candidate buffers of the plurality of buffers, and
      select the second buffer, from the plurality of candidate buffers, based on the first weight and the second weight.

12. The non-transitory computer-readable medium of claim 9, where the one or more instructions to select the second buffer comprise:
one or more instructions that, when executed by the device, cause the device to:
select the second buffer by using a random selection process and based on the first weight and the second weight.

13. The non-transitory computer-readable medium of claim 9, where the threshold is selected by an operator associated with the device.

14. A system comprising:
a device to:
determine a first amount of space being used in a first buffer of a plurality of buffers;
determine a first weight, for the first buffer, based on a difference between a threshold and the first amount of space being used in the first buffer;
determine a second amount of space being used in a second buffer of the plurality of buffers;
determine a second weight, for the second buffer, base on a difference between the threshold and the second amount of space being used in the second buffer;
select the first buffer based on the first weight;
select the second buffer based on the first weight and the second weight; and
transmit a particular packet to the second buffer after selecting the second buffer.

15. The system of claim 14, where the device is further to:
determine a value, for the second buffer, based on the second amount of space being used in the second buffer; and
determine that the value does not exceed the threshold before selecting the second buffer.

16. The system of claim 14, where, when selecting the second buffer, the device is to:
determine that a value, associated with a third buffer of the plurality of buffers, exceeds the threshold,
remove, based on the value exceeding the threshold, the third buffer from being one of a plurality of candidate buffers of the plurality of buffers,
the second buffer being one of the plurality of candidate buffers, and select, based on the first weight and the second weight, the second buffer from the plurality of candidate buffers.

17. The system of claim 16, where the device is further to:
determine the value based on an amount of space being used in the third buffer.

18. The system of claim 16, where the device is further to:
determine the value based on information associated with the particular packet.

19. The system of claim 18, where the information associated with the particular packet includes a length of the particular packet.

* * * * *